Patented Nov. 22, 1932

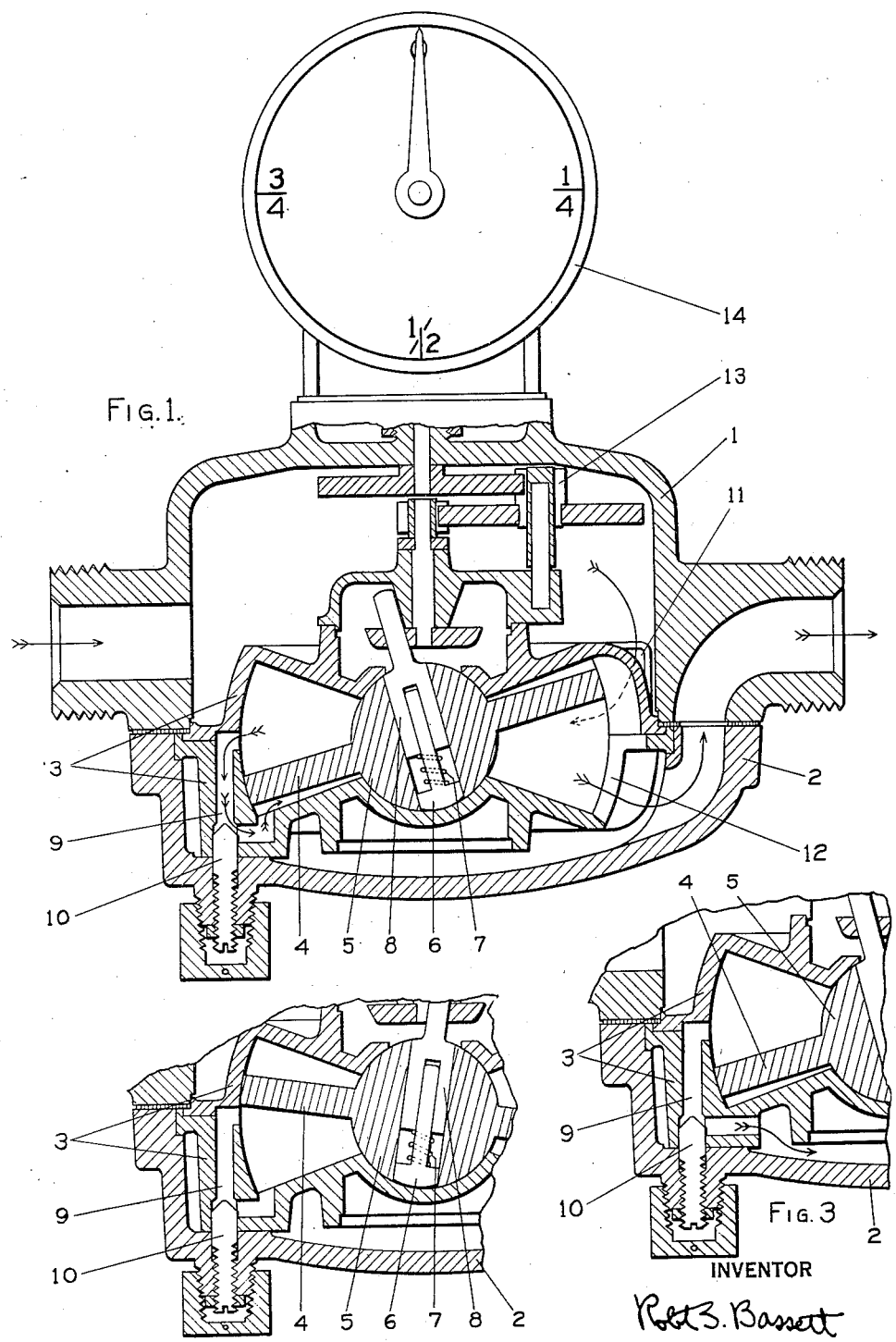

1,888,369

UNITED STATES PATENT OFFICE

ROBERT S. BASSETT, OF BUFFALO, NEW YORK

LIQUID METER

Application filed July 16, 1930. Serial No. 468,475.

My invention relates to improvements in liquid meters in which an indicator is driven by a liquid operated mechanism and more particularly to those in which the working joints of the liquid operated mechanism are kept semi-tight by a film of liquid retarded in its passage through said working joint by capillary attraction or what is commonly called liquid packing.
The objects of my invention are to provide means for adjusting such meters for accuracy by providing a small compensating by-pass in the liquid operated mechanism which will pass liquid around the driven member of the mechanism during a portion of the working cycle only, and also to provide a thrust bearing for supporting the disc piston within the liquid operated mechanism when the mechanism is of the nutating disc piston type.

I will now proceed to definitely describe the manner in which I have carried out my invention and then claim what I believe to be novel.

In the drawing Figure 1 is a central vertical longitudinal view of my improved meter showing the outside of the indicator and showing a section through the meter body through the interior working parts as they are placed in the meter body.
Figure 2 is a fragmentary sectional view through the liquid operated measuring mechanism which is shown of the nutating disc piston type. In this view the piston has been moved from the position shown in Figure 1 so that both ends of the by-pass are connected to the same side of the piston chamber as divided into two parts by the piston. In Figure 1 the two ends of the by-pass are connected to two different portions of the piston chamber on opposite sides of the piston.

Figure 3 is a fragmentary sectional view of a modified form of the invention, said section being taken through the by-pass showing one end connected to the piston chamber at a point approximately central on the wall over which the piston travels while the other end of the by-pass is connected to the space immediately adjacent to the outside of the piston chamber.
The outer casing of the meter is composed of two detachable parts 1 and 2 which may be held together by conventional means which are not shown. Liquid operated measuring mechanism 3 is supported within the outer casing of the meter and in the drawing is shown of the well-known nutating disc piston type. 4 is the rigid piston which, when of the nutating disc piston type, has a ball portion 5 which centers it within mechanism 3. 6 is a thrust bearing which is preferably made of a hardened material to resist wear and is separate from piston 5. 7 is a spring forcing thrust bearing 6 outward though the exact construction is not limited to that shown in the drawing. This spring 7 is preferably of just sufficient strength to cause the thrust bearing 6 to carry all of the weight of the disk piston 4. By this arrangement, all substantially vertical pressures imposed by (and hence the frictional resistance of) said piston 4 against the casing of the liquid operated mechanism 3 is rendered almost negligible. 8 is the disc pin which is press-fitted in the bore of said piston 4 and is shown with a recess in its lower end for guiding the upper end of thrust bearing 6 though the exact construction is not limited to that shown as there may be many modifications. In the drawing the lower end of thrust bearing 6 is shown with a radius of curvature slightly smaller than that of ball portion 5 of disc piston 4. 9 is a by-pass one end of which at least is connected to measuring mechanism 3. The two ends of by-pass 9 are located so that liquid passes through the by-pass during a portion of the measuring cycle only.

The object of this construction is to provide a portion of the measuring cycle during which the by-pass does not operate so that there will be a maximum driving force exerted on the piston to overcome frictional resistance which may tend to stop the meter. The ends of the by-pass can be so located that the by-pass is opened during the point of maximum effective driving power on the piston and closed at the minimum point, these points being determined with the by-pass entirely closed by means of its regular control. This result is obtained by reason of the location of said by-pass 9, the same being shown positioned opposite the median line between the intake opening 11 and the outlet opening 12. The pressure of liquid operating the disk piston 4 is directed against its upper face and the maximum area of this face is located adjacent said by-pass 9 by reason of the fact that such a disk piston 4 is necessarily (and as well known in the art) slit radially intermediate of aforesaid intake and outlet openings 11 and 12. Hence by locating the by-pass 9 in the position illustrated, the liquid which is under pressure, and is operating to drive said disk, is partially bled off or shunted through said by-pass 9 in just the position of the piston when it is otherwise being subjected to the greatest liquid pressure or maximum effective power. By thus bleeding said liquid pressure at this particular point in the peripheral wall of the measuring mechanism 3, there results the least likelihood of the piston sticking in place due to an insufficient liquid pressure driving force. Conversely when said disk piston 4 is subjected to a minimum effective liquid pressure, the portion of said piston located adjacent said by-pass 9 is in its extreme upper position in which case said by-pass connects two parts of the interior of said meter which are under equal pressure, both terminii of said by-pass in this position of said piston 4 opening into the space below said piston.

This is a great improvement over previously existing by-pass which were operative throughout the entire measuring cycle so that regardless of the position of the piston it has always been possible for the entire flow of liquid to pass through the by-pass without moving the piston. In my invention the by-pass is operative during a portion of the measuring cycle only so that when the measuring cycle is started the by-pass will usually be inoperative; so that there will be in a large percentage of the cases, a much greater force available to start the meter in operation than in previously existing types when the by-pass was opened throughout the entire measuring cycle.

Measuring mechanism 3 has inlet opening 11 and outlet opening 12 and is operatively connected to indicator 14 by connecting means 13 which is shown as a train of spur gearing of the customary type.

The by-pass construction is not limited to the exact form shown as the limiting features in my invention are that at least one end of the by-pass is connected to a point in the measuring mechanism having a fluctuating pressure due to the motion of the piston. The other end of the by-pass may connect to the measuring mechanism chamber or it may connect to the space inside the meter casing adjacent to the outside of the measuring mechanism.

Another limiting feature of the by-pass is that it will be fitted with a control valve 10 which may be of the needle type as shown and which is shown in the drawing with one end of the valve mechanism extending to the outside of the meter casing for manual adjustment without opening the meter casing. The type of piston is limited only to a piston, one portion of which reciprocates back and forth in approximately opposite directions over some portion of the interior wall of the measuring mechanism chamber. This reciprocating portion of one part of the disc piston is found with oscillating and nutating pistons as well as a simple reciprocating piston.

My invention does not cover meters having a rotary piston which always passes over the interior wall of the measuring mechanism in the same direction as experiments which I have made have shown that this type of meter does not measure accurately when fitted with a by-pass control.

When a nutating disc piston type of meter is used I have found that it is very desirable to minimize the friction of the piston. In my meter I have provided a thrust bearing which supports the nutating piston and which by proper selection of materials can be so designed as to reduce the friction very much below that of the usual type of disc in which the entire surface of the ball portion of the disc piston is in contact with the socket in the measuring mechanism chamber. I have found that the best results are obtained when the radius of curvature of the contact end of the thrust bearing is slightly less than the radius of curvature of the ball portion of the disc piston. I have also found that a spring mounting for the thrust bearing is desirable. In my drawing I have shown the thrust bearing mounted movably in regard to the disc piston though my invention is not limited to a movable mounting as an adjustable mounting with definite settings for the thrust bearing can also be used.

Having described my invention what I claim as new and desire to secure by Letters Patent is—

1. In a liquid meter of the piston type, a piston chamber having inlet and outlet openings and having a by-pass one end of which has a port opening directly into said chamber, a liquid operated piston having a cycle of travel within said piston chamber and passing over a portion of said piston chamber wall with a reciprocating motion, said by-pass connecting for a part of the piston travel cycle the portion of the interior of said piston chamber under inlet pressure with the portion of the interior of said piston chamber under outlet pressure, and connecting for the balance of the piston travel cycle two parts of the interior of said meter under substantially equal pressure, and means for regulating at one point the cross sectional area of said by-pass, substantially as and for the purpose described.

2. In a liquid meter of the piston type, a piston chamber having inlet and outlet openings and having a by-pass one end of which has a port opening directly into said chamber, a liquid operated nutating disc piston having a cycle of travel within said piston chamber and passing over a portion of said piston chamber wall with a reciprocating motion, said by-pass connecting for a part of the piston travel cycle the portion of the interior of said piston chamber under inlet pressure with the portion of the interior of said piston chamber under outlet pressure, and connecting for the balance of the piston travel cycle two parts of the interior of said meter under substantially equal pressure, and means for regulating at one point the cross sectional area of said by-pass, substantially as and for the purpose described.

3. In a liquid meter of the piston type, a piston chamber having inlet and outlet openings and having a by-pass one end of which has a port opening directly into said chamber, a liquid operated piston having a cycle of travel within said piston chamber and passing over said port of said piston chamber wall with a reciprocating motion, whereby the flow through said by-pass during a part of the piston travel cycle is substantially cut off, and means for regulating at one point the cross sectional area of said by-pass, substantially as and for the purpose described.

4. In a liquid meter of the piston type, a piston chamber having inlet and outlet openings and having a by-pass one end of which has a port opening directly into said chamber, a liquid operated nutating disc piston having a cycle of travel within said piston chamber and passing over said port of said piston chamber wall with a reciprocating motion, whereby the flow, through said by-pass during a part of the piston travel cycle is substantially cut off, and means for regulating at one point the cross sectional area of said by-pass, substantially as and for the purpose described.

5. In a liquid meter of the piston type; a piston chamber having inlet and outlet openings; a liquid operated nutating disc piston having a ball portion engaging said piston chamber and means adapted to support the weight of said piston; said means comprising a thrust bearing resiliently mounted diametrically within said ball portion and engaging the wall of said piston chamber, and means for resilienty mounting said bearing within the ball portion, substantially as and for the purpose described.

6. In a liquid meter of the piston type, a piston chamber having inlet and outlet openings; a liquid operated nutating disc piston having a ball portion engaging said piston chamber, having a cycle of travel within said piston chamber and passing over a portion of said piston chamber wall with a reciprocating motion; a thrust bearing mounted within said ball portion and engaging the wall of said piston chamber at a point adjacent to said ball portion of said piston; there being a by-pass connecting for a part of the piston travel cycle the portion of the interior of said piston chamber under inlet pressure with the portion of the interior of said piston chamber under outlet pressure, and connecting for the balance of the piston travel cycle two parts of the interior of said meter under substantially equal pressure; and means for regulating at one point the cross sectional area of said by-pass, substantially as and for the purpose described.

7. In a liquid meter of the piston type, a piston chamber having inlet and outlet openings and having a by-pass, one end of which has a port opening directly into said chamber; a liquid operated piston having a cycle of travel within said piston chamber and adapted to cover and uncover said port; a registering mechanism and means operatively connecting said registering mechanism with said piston.

8. A liquid meter comprising a piston chamber provided with inlet and outlet openings and having a by-pass one end of which has a port opening into said chamber; a liquid operated piston arranged in said chamber and adapted to pass over said port and to thereby control the flow of fluid through said by-pass; a registering mechanism and means operatively connecting said registering mechanism with said piston.

9. In a liquid meter of the piston type, a piston chamber having inlet and outlet openings and having a by-pass, one end of which has a port opening directly into said chamber; a liquid operated piston having a cycle of travel within said piston chamber and adapted to cover and uncover said port; a valve adapted to control the amount of flow through said by-pass; a registering mechanism and means operatively connecting said registering mechanism with said piston.

ROBT. S. BASSETT.